Jan. 8, 1935.  F. T. ULM  1,986,948
GATE HANGER
Filed Dec. 19, 1933
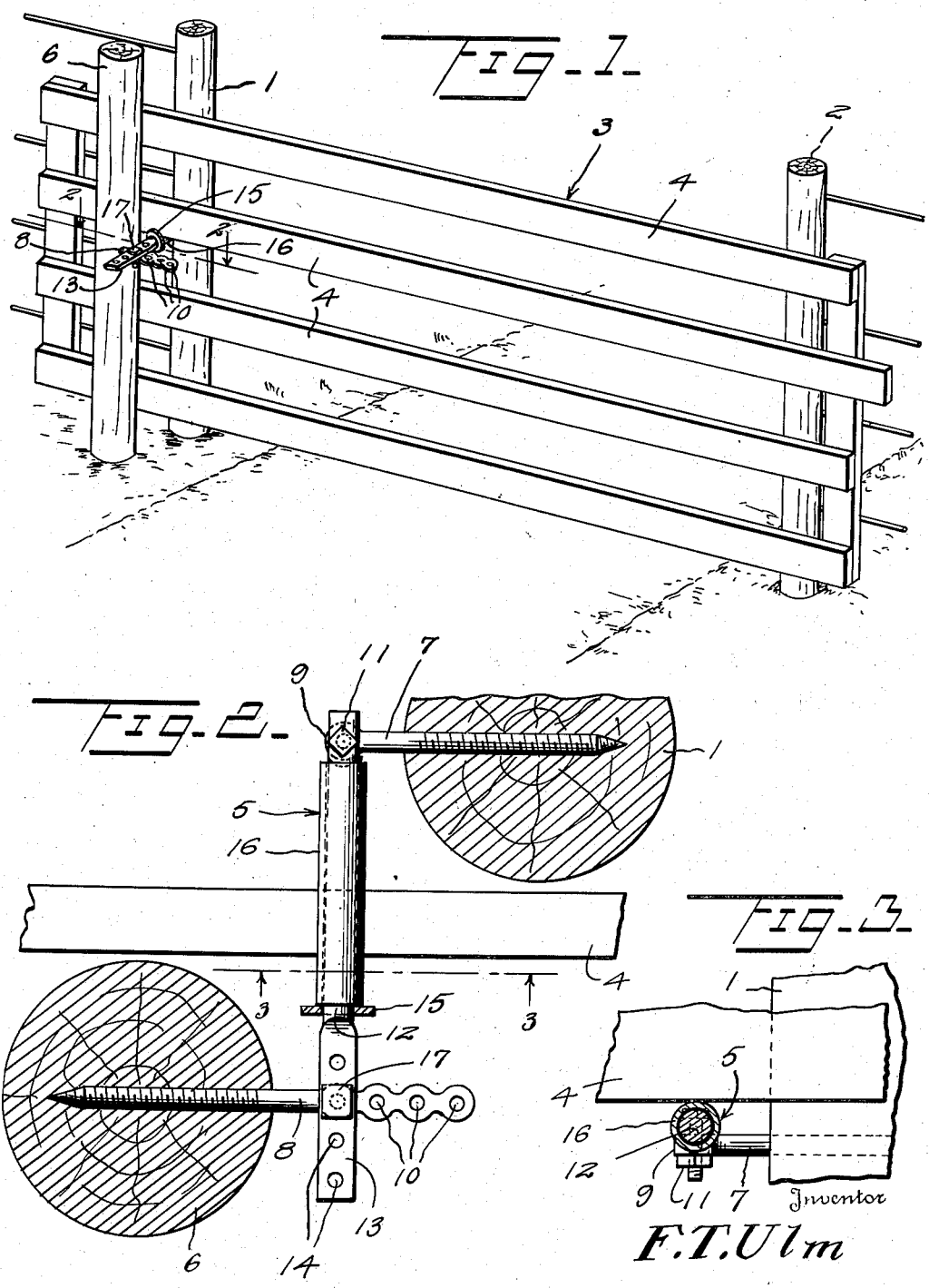

Patented Jan. 8, 1935

1,986,948

UNITED STATES PATENT OFFICE 1,986,948

GATE HANGER

Fred T. Ulm, London Mills, Ill.

Application December 19, 1933, Serial No. 703,109

2 Claims. (Cl. 16—86.2)

This invention relates to improvements in supporting devices or hangers for shiftable barriers, and pertains particularly to an improved hanger structure for a gate.

The primary object of the present invention is to provide a novel form of hanger for gates which are made up of a plurality of vertically spaced horizontal bars, one of which is designed to engage and move over the hanger and wherein the hanger is adapted to be readily partially dismounted so that the gate may be shifted vertically for the selective engagement of one of its horizontal bars with the hanger.

In gates separating farm pastures or stockyards, it is sometimes desirable to partially open the passageway between the yards so that smaller animals, such as lambs or shoats may pass through without permitting the larger or full grown animals to pass.

The present invention is designed to support a horizontal bar gate in such a manner that the gate may be easily and quickly shifted to completely open the gateway, and it is also designed to permit the ready vertical adjustment of the gate so that an opening may be formed therebeneath of a size to permit small animals to pass through while barring the passage of larger ones.

A further object of the invention is to provide a hanger for a horizontal bar gate which may be readily mounted between two supporting posts after the latter have been set and even though the posts may not have been placed exactly as intended.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in perspective of a horizontal bar gate showing the hanger embodying the present invention in operative position in association therewith.

Figure 2 is a horizontal sectional view taken on the line 2—2 of Figure 1.

Figure 3 is a sectional view taken on the line 3—3 of Figure 2.

Referring to the drawing wherein like numerals of reference designate corresponding parts throughout the several views, the numerals 1 and 2 indicate the usual gateway posts of a fence line while the numeral 3 indicates generally a gate of the horizontal bar type, the several bars being in vertically spaced parallel relation and indicated by the numeral 4.

The hanger device embodying the present invention, is indicated as a whole by the numeral 5 and in placing the same in use, there is mounted adjacent to one of the posts of the gateway, as for example, the post 1, an extra post which is indicated by the numeral 6 and which is offset with respect thereto, as regards the adjacent road edge.

The hanger 5 comprises the two threaded bolts 7 and 8, one of which is mounted in the post 1 while the other is mounted in the post 6. The bolt 7 is provided with the single eye 9 at its outer end while the bolt 8 is formed to provide a longitudinally extending series of eyes 10. Pivotally secured at one end to the eye 9 of the bolt 7, by the pivot bolt 11, is a bearing bar 12. The end of the bar which is secured to the bolt 7 is flattened so that it will lie against the eye 9 firmly, and a considerable length of the bar at the opposite end is also flattened, as indicated at 13, and this long flattened portion is provided with the longitudinal extending series of apertures 14. Between the flattened portions, the bar 12 is circular in cross section, as illustrated in Figure 3, and surrounding the bar 12 adjacent the flattened portion 13 is a collar 15, which serves to limit longitudinal movement on the bar of the roller sleeve 16 through which the round portion of the bar extends.

The flattened portion 13 of the bar 12 overlies one of the series of apertures 10 of the bolt 8, and is secured to the bolt 8 by the bolt 17 in the manner illustrated.

The sleeve 16 lies beneath and has one of the bars 4 of the gate resting thereon. It will thus be apparent that the gate is opened by lifting the end remote from the hanger unit and then shifting the gate longitudinally so that the bar engaging the sleeve 16 will move thereover and the sleeve will rotate on the bar 12. If it is desired to lift one end of the gate further from the ground, the bolt 17 is taken out and swung over toward the post 7 and by slightly swinging the free end of the gate in the opposite direction, the gate can be lifted so that the bolt and sleeve may be swung back beneath the next lowest bar 4 of the gate and the gate will then be held higher at the end adjacent the hanger 5 than at the opposite end, when it is closed. By this means, small animals may pass under the gate but the larger animals will be held back.

It will also be apparent that by providing the bolt 8 with the series of apertures at its head end and by providing the series of apertures 14 in the adjacent end of the bar 12, it is not essential that the posts 1 and 6 be set always in exactly the same relation for adjustment may be made between the parts of the hanger to compensate for differences in the positions of the posts.

The use of the present invention eliminates the use of the usual wooden cleat on which to slide the gate, which cleat has worn therein by the bar of the gate groove, which results in the splitting of the gate bar when an attempt is made to carry the gate to the right or the left as it is being opened.

It will be readily apparent that by reversing the positions of the posts 1 and 6 or by connecting the line of the fence with the post 6 instead of the post 1, the free end of the gate may be swung across the roadway while the gate is at the same time being shifted transversely thereof so as to move the gate into a position parallel with the road. It is this movement of the gate which causes damage to the carrying bar thereof in the old style of hanger when the latter is made of wood and has become deeply grooved through the constant sliding movement of the carrier bar thereacross.

What is claimed is:—

1. A gate hanger, comprising a round bar having a portion of one end flattened and provided with a plurality of apertures, there being an aperture adjacent the other end, a sleeve surrounding said bar between the flattened portion and said last aperture, a washer surrounding the bar between the flattened portion and the sleeve, the washer being engaged on one side by said sleeve and retained limited in its movement by the said flattened portion, a screw having an apertured end, a bolt passing through said screw end aperture and the last mentioned aperture of the bar, a screw having an elongated flattened head having a plurality of apertures, and a bolt passing through one of said last screw apertures and an aperture of the flattened portion of the bar.

2. A gate hanger, comprising a round bar having a portion of one end flattened and provided with a plurality of apertures, there being an aperture through the bar adjacent the opposite end thereof, means at the last mentioned end of the bar for mounting the same upon a support, pivotal connecting means passing through the aperture of the said last end of the bar and the mounting means, an element upon the opposite end of the bar from the singly apertured end for connecting the same to a fixed support, said element having an elongated head arranged in crossed relation with the flattened end of the bar and having a plurality of apertures, one of which is alined with an aperture in the flattened end of the bar, a pivot element passing through said alined apertures, means upon the bar adjacent the flattened end thereof for limiting the movement of a body on and longitudinally of the bar, and a sleeve surrounding the bar and having one end disposed adjacent said last means and limited thereby in its movement on the bar.

FRED T. ULM.